United States Patent
Aaron (10) Patent No.: US 7,954,143 B2
(45) Date of Patent: May 31, 2011

(54) METHODS, NETWORK SERVICES, AND COMPUTER PROGRAM PRODUCTS FOR DYNAMICALLY ASSIGNING USERS TO FIREWALL POLICY GROUPS

(75) Inventor: Jeffrey Aaron, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 968 days.

(21) Appl. No.: 11/598,434

(22) Filed: Nov. 13, 2006

(65) Prior Publication Data
US 2008/0115190 A1    May 15, 2008

(51) Int. Cl.
H04L 29/06    (2006.01)

(52) U.S. Cl. ......... 726/11; 726/1; 726/2; 726/3; 726/27; 713/166

(58) Field of Classification Search ................ 726/1, 11, 726/23
See application file for complete search history.

(56) References Cited

U.S. PATENT DOCUMENTS

| | | | | |
|---|---|---|---|---|
| 7,237,114 B1* | 6/2007 | Rosenberg | ..................... | 713/176 |
| 7,237,260 B2* | 6/2007 | Yu et al. | .......................... | 726/11 |
| 7,458,094 B2* | 11/2008 | Jackson | ............................ | 726/2 |
| 7,475,424 B2* | 1/2009 | Lingafelt et al. | ................ | 726/13 |
| 7,540,014 B2* | 5/2009 | Vasishth et al. | ................... | 726/1 |
| 7,644,436 B2* | 1/2010 | Izatt et al. | .......................... | 726/11 |
| 7,765,313 B2* | 7/2010 | Jain et al. | ....................... | 709/230 |
| 7,765,581 B1* | 7/2010 | Caronni et al. | ................... | 726/3 |
| 2003/0229805 A1* | 12/2003 | Perry | ............................ | 713/200 |
| 2004/0044866 A1* | 3/2004 | Casazza | ......................... | 711/163 |
| 2004/0162992 A1* | 8/2004 | Sami et al. | ..................... | 713/200 |
| 2004/0193912 A1* | 9/2004 | Li et al. | ........................... | 713/200 |
| 2004/0268150 A1* | 12/2004 | Aaron | ........................... | 713/201 |
| 2005/0120242 A1* | 6/2005 | Mayer et al. | .................. | 713/201 |
| 2005/0125697 A1* | 6/2005 | Tahara | ........................... | 713/201 |
| 2005/0149717 A1* | 7/2005 | Orlando et al. | ............... | 713/150 |
| 2005/0169282 A1* | 8/2005 | Wittman | ........................ | 370/401 |
| 2005/0273850 A1* | 12/2005 | Freund | ............................ | 726/14 |
| 2006/0174337 A1* | 8/2006 | Bernoth | ........................... | 726/11 |
| 2006/0248580 A1* | 11/2006 | Fulp et al. | ........................ | 726/11 |
| 2007/0016945 A1* | 1/2007 | Bassett et al. | ................... | 726/11 |
| 2007/0130330 A1* | 6/2007 | Ridel et al. | ..................... | 709/224 |
| 2007/0143851 A1* | 6/2007 | Nicodemus et al. | ............ | 726/25 |
| 2007/0261112 A1* | 11/2007 | Todd et al. | ....................... | 726/11 |
| 2007/0294744 A1* | 12/2007 | Alessio et al. | ..................... | 726/1 |
| 2008/0097786 A1* | 4/2008 | Sachdeva | .......................... | 705/2 |
| 2008/0148380 A1* | 6/2008 | Abzarian et al. | ................ | 726/11 |
| 2008/0163357 A1* | 7/2008 | Xiao | ............................... | 726/15 |

* cited by examiner

*Primary Examiner* — Nathan Flynn
*Assistant Examiner* — Viral S Lakhia
(74) *Attorney, Agent, or Firm* — Myers Bigel Sibley & Sajovec, P.A.

(57) ABSTRACT

Methods, network services, and computer program products that dynamically assign computer network users to firewall policy groups are provided. A user is assigned to a first firewall policy group, and user activity on the computer network is monitored. The user is assigned to a second, different firewall policy group automatically if monitored user activity indicates that a change in detail level of rules is necessary. Each firewall policy group has rules that control whether to block or allow communications through firewalls on the computer network. The firewall policy groups are arranged in a hierarchical structure having a plurality of levels that are arranged such that rules within the firewall policy groups are different at each level. A user may be assigned to a different firewall policy group that is below, above, or at the same level as the initial firewall policy group.

14 Claims, 4 Drawing Sheets

METHODS, NETWORK SERVICES, AND COMPUTER PROGRAM PRODUCTS FOR DYNAMICALLY ASSIGNING USERS TO FIREWALL POLICY GROUPS

FIELD OF THE INVENTION

The present invention relates generally to communications networks and, more particularly, to firewalls for communications networks.

BACKGROUND OF THE INVENTION

Conventionally, firewalls are located at network or sub-network perimeter points such as gateways or routers/switches protecting servers and consist of one or more programs configured to protect the resources of a network or sub-network from users outside the network. For example, an enterprise with an intranet that allows its workers access to the Internet may utilize a firewall to prevent outsiders from accessing data resources on the intranet and for controlling what Internet resources enterprise users have access to. Conventionally, a firewall examines each network packet to determine whether to forward the packet to its destination. For mobile users, firewalls may be configured to allow remote access to a private network via secure logon procedures and authentication certificates, etc. Firewalls may alternately or additionally be located directly on end user devices such as computing devices, cell phones and other wireless devices, etc.

By blocking unauthorized communications into and out of a network, firewalls protect against hackers who may try and compromise network security by installing unauthorized applications on or otherwise attacking one or more network devices. These unauthorized applications may allow a hacker to obtain private and/or sensitive information from one or more network devices (e.g., passwords, credit card numbers, social security numbers, web sites visited, etc.). Other types of attacks can cause network devices to crash or malfunction, be unable to communicate, or lead to data loss/corruption. Although effective in thwarting hackers, firewalls can present problems to legitimate network users by blocking communications of authorized applications. Often, a firewall expert is required to configure a firewall to explicitly allow authorized applications to communicate through a firewall.

In addition, a firewall policy (i.e., the rules that a firewall follows to block or allow a communication therethrough) may be challenging to optimize in an enterprise setting with multiple users having differing application communication requirements. Generally, setting firewall policy in an enterprise is a compromise, simplified for a variety of reasons including, but not limited to, a lack of knowledge of users and their activities, a need to achieve a balance of protection versus usability, and the (increasing) complexity of the technical aspects of communications a firewall is intended to mediate. A compromise often made is to arbitrarily place users in different firewall policy groups and then use several corresponding generalized policy configurations that are intended to very roughly match those user groups. Unfortunately, this may be unsatisfactory to some users in the firewall policy groups and may result in excessive help desk calls due to mismatches between generalized firewall settings and actual user behavior (e.g., the types and specific applications actually used). Accordingly, there is a need for improving the general approach to setting firewall policies such as group-based firewall policies in an enterprise setting and/or ISP (Internet Service Provider) policies in a customer setting.

SUMMARY OF THE INVENTION

Embodiments of the present invention provide methods, network services, and computer program products that automatically initialize computer network users into a best-expected-match firewall policy group, then continuously gather information regarding the users so as to refine the best-match over time and move the users to more appropriate firewall policy groups. Information gathering can be "forced", according to some embodiments of the present invention, and this may be done so that stalling of application communications can be avoided. Thus a user can be reassigned to a more detailed firewall policy group, even before a blocking (obstruction) event associated with a new application is encountered, thereby avoiding blocking of communications of the new application. Over a period time, the user may be moved back to a less-detailed policy group that does not allow a particular communication type, thereby continually adjusting the user's policy group to best-match their activities.

According to some embodiments of the present invention, a method of dynamically assigning a computer network user to one of a plurality of firewall policy groups arranged in a hierarchical structure includes assigning a user to a first firewall policy group, monitoring user activity on the computer network, and assigning the user to a second, different firewall policy group automatically if monitored user activity indicates that a change in detail level of firewall rules is necessary. Each firewall policy group has rules that control whether to block or allow communications through firewalls on the computer network. The hierarchical structure includes a plurality of levels that are arranged such that firewall rules within the firewall policy groups have different levels of detail at each level. For example, the rules may be more detailed with each descending level, etc.

According to some embodiments of the present invention, a user may be assigned to a firewall policy group at a level above a level of an existing firewall policy group if a predefined period of time has elapsed without expected user activity on the computer network (e.g., without expected user use of an application, etc.). Moreover, a user's requirements may have changed that dictate assigning the user to a different firewall policy group. A user may be assigned to a different firewall policy group that is below, above, or at the same level as an initial firewall policy group. Once reassigned, a user may be notified of the reassignment. Alternatively, user input may be requested and utilized in the decision making process regarding whether to reassign the user to another firewall policy group.

According to some embodiments of the present invention, a network service that is configured to dynamically assign computer network users to firewall policy groups includes an activity analyzer component, a policy controller component, and a database. The database contains analysis rules, analysis-relevant data, firewall policy group selection rules, user profile data for network users, and various other parameters and data. The activity analyzer component is configured to receive information from firewall agents at respective firewalls on a communication network and from user-activity agents at respective user devices connected to the communication network. The activity analyzer component retrieves relevant rules and data from the database, analyzes the information received from a firewall agent and user-activity agent to determine what firewall rule detail level is required by user activity, and assigns users to firewall policy groups. According to some embodiments of the present invention, the activity analyzer component may be configured to request user input and utilize any received user input in decisions regarding assignment of users to firewall policy groups.

Each user-activity agent at a user device monitors user activity including application use, collects information regarding user activity and communicates this information to the network service. Each firewall agent detects communications associated with each user on the network, collects/assembles relevant information regarding user communications, and sends this information to the network service.

According to some embodiments of the present invention, the activity analyzer component is configured to reassign a user to a firewall policy group at a level above a present level if a predefined period of time has elapsed without expected user activity.

The reassignment of users to different firewall policy groups can take place seamlessly and without the knowledge of users, if so desired. Alternatively, the network service may be configured to notify users when reassigned to the different firewall policy groups. In addition, the network service may be configured to request user input regarding user activity prior to and/or after reassigning a user to a different firewall policy group.

According to some embodiments of the present invention, the policy controller component is in communication with the activity analyzer component and is configured to communicate firewall policy group assignments and changes thereto to the firewall agents. The firewall agents implement the decisions of the activity analyzer component with respect to firewall policy group assignments.

According to some embodiments of the present invention, if a firewall agent detects a blocked communication attempt by a respective firewall, the network service determines whether to move the user involved in the communication attempt to a different firewall policy group so that the communication is allowed through the firewall. If the network service determines that it is okay to allow the communication through the firewall, the user is assigned to a different firewall policy group that allows the communication through the firewall.

Other methods, network services and/or computer program products according to embodiments of the invention will be or become apparent to one with skill in the art upon review of the following drawings and detailed description. It is intended that all such additional methods, systems (e.g., network services), and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems (e.g., network services), and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, or communicate the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems (e.g., network services), and computer program products in accordance with exemplary embodiments of the invention. These flowchart and/or block diagrams further illustrate exemplary operations for dynamically assigning computer network users to firewall policy groups, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The term "agent", as used herein, refers to a program (or programs) that executes on a device and that gathers information and/or performs some service, typically without requiring a user's presence or knowledge.

The term "firewall", as used herein, refers to any type of firewall including, but not limited to, "network firewalls" located at the edge of a communications network, and host firewalls located on a server and/or on a user's device such as a computing device, wireless device, etc. The location of a firewall is not intended to be limiting in any respect to embodiments of the present invention.

The term "firewall policy group", as used herein, refers to a group of computer network users who are believed to use similar software applications and/or that engage in similar activities on a computer network. Each firewall policy group includes a respective set of rules or other methods/mechanisms/techniques that a firewall on a computer network will follow or utilize in order to block or allow a communication therethrough.

The term "security policy", as used herein, refers to the rules or other methods/mechanisms/techniques utilized by a firewall to determine if a particular communication through the firewall should be allowed or blocked or dropped. Conventionally, if a communication is blocked by a firewall, the originator of the communication is notified of the block. To "drop" a communication is to block the communication without providing any notification to the originator of the communication. As used herein, the term "blocked communication" will include dropped communications. As used herein, the terms "blocked" and "block" when used in reference to communications may also be understood to include meaning "dropped" and "drop," respectively.

Figure 1:
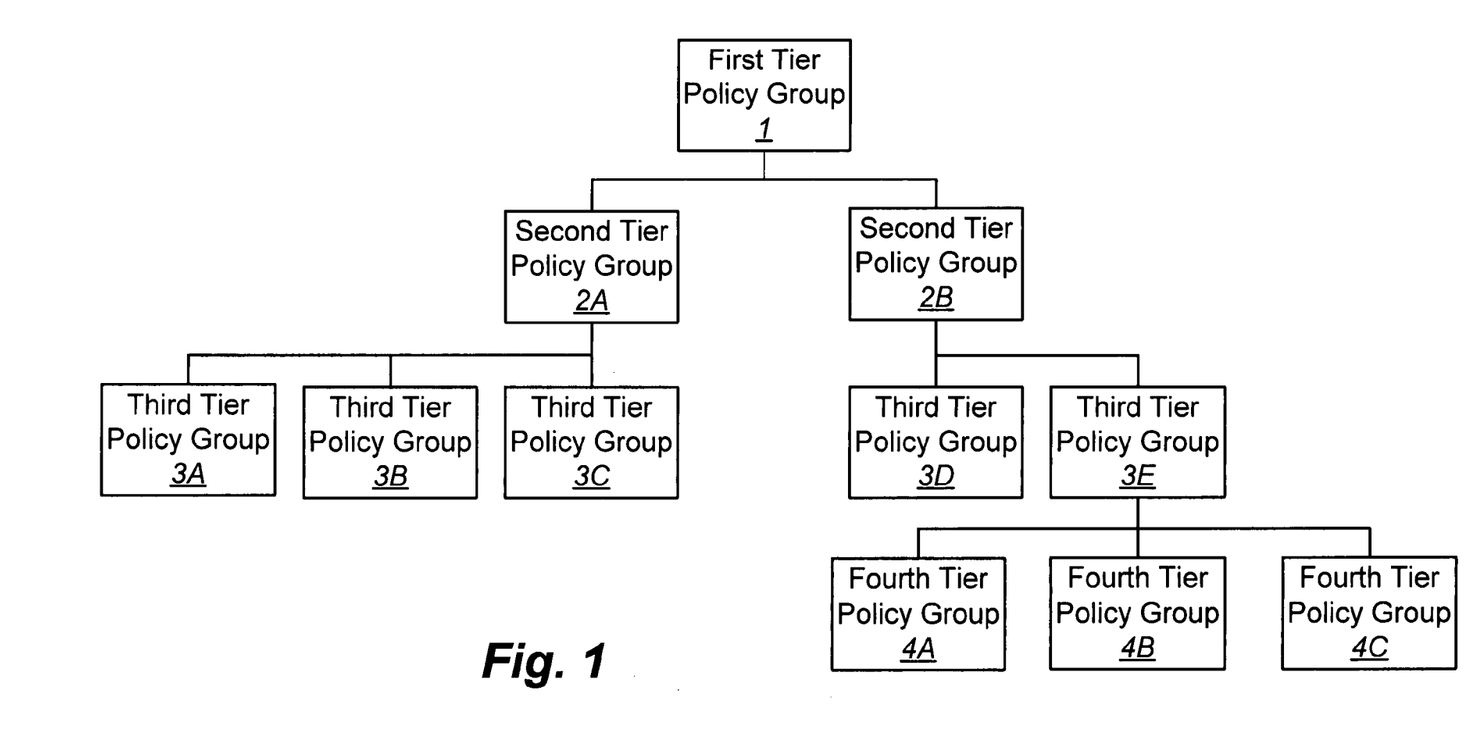
FIG. 1 illustrates a hierarchical firewall policy group structure, according to some embodiments of the present invention.

FIG. 1 illustrates a hierarchical firewall policy group structure, according to some embodiments of the present invention. The illustrated hierarchical firewall policy group structure includes multiple layers or tiers of policy groups. For example, the uppermost level is the first tier policy group 1. Policy group 1 represents the policy group with the least amount of details regarding firewall communication rules. The amount of detail, and thus for instance the specificity, increases for policy groups in the respective descending levels. For example, second tier policy groups 2A and 2B have greater firewall rule details than the first tier policy group 1. Similar, the third tier policy groups 3A-3E have greater firewall rule details, and likely greater specificity, than the second tier policy groups 2A and 2B, and so forth. Note that in general, and when done correctly, greater detail/greater specificity of security policy often affords better and more appropriate protection than lesser detail/lesser specificity, in part because more specific rules present less opportunity for a hacker to take advantage of, sometimes referred to via the analogy that the "holes" through the firewall are "smaller."

In the illustrated hierarchical firewall policy group structure, policy groups at the same level (e.g., second tier policy groups 2A and 2B) contain respective groups of users who engage in different activities on a computer network (i.e., utilize different applications, etc.), but that require a similar amount of firewall rule details. For example, second tier policy group 2A may contain users who utilize computer aided drafting software and second tier policy group 2B may contain users who utilize image processing software. Both types of software, computer aided drafting and image processing, may need to access web sites external to a computer network periodically for updates to the respective software. Accordingly, although the two types of software are different, their requirements for communications through network firewalls are similar and can be handled by similar levels of detail in firewall rules.

In contrast, policy groups at different levels (e.g., second tier policy group 2A and third tier policy group 3B) contain respective groups of users who engage in different activities on a computer network (i.e., utilize different applications, etc.), and that also require different amounts of firewall rule details. For example, third tier policy group 3B may contain users who engage in online gaming. As such, the level of details needed for firewall rules for online gaming (e.g., because of multiple port use, etc.) is higher than that required for periodic online updates for computer aided drafting software.

Figure 2:
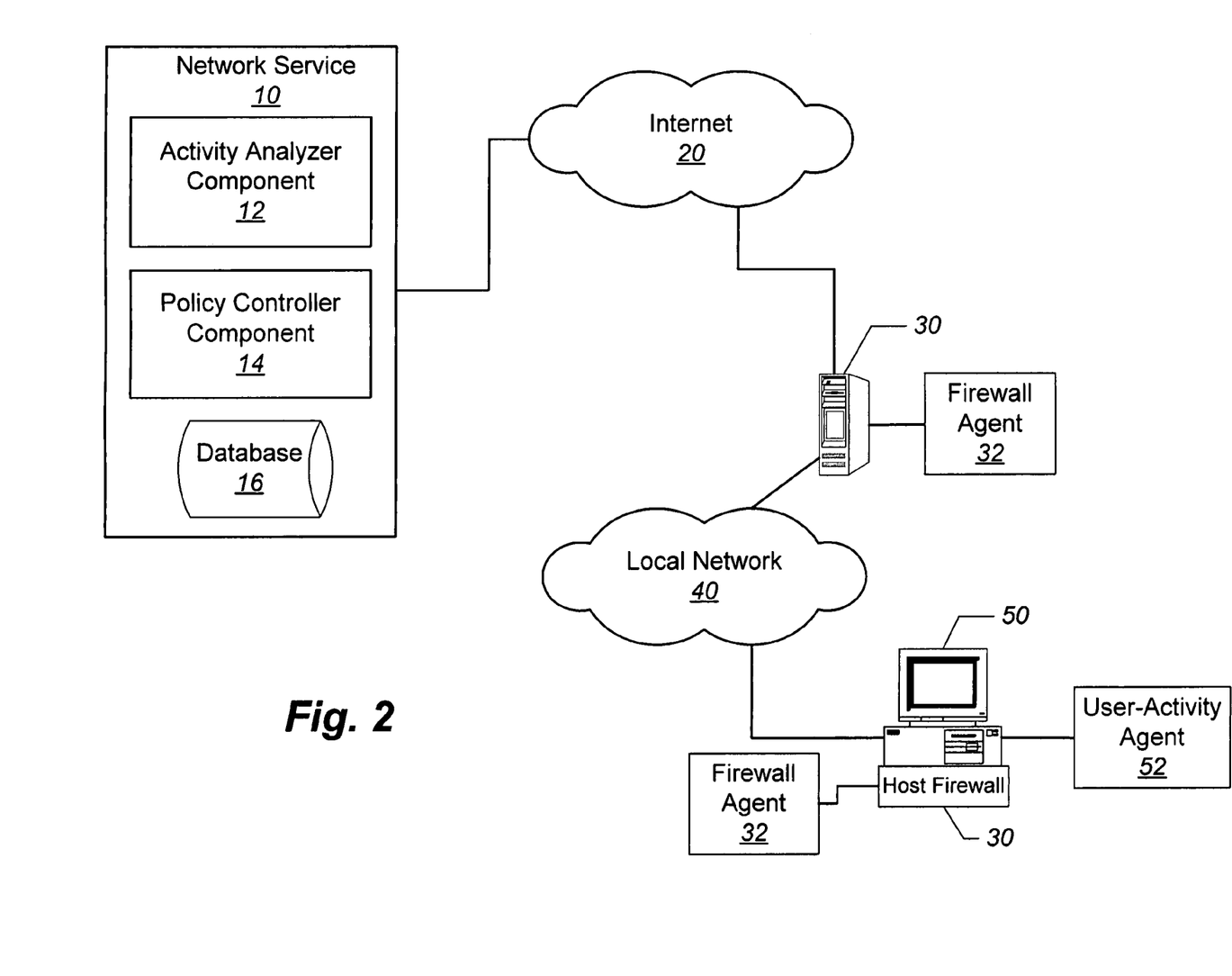
FIG. 2 is a block diagram that illustrates an exemplary network service that is configured to dynamically assign computer network users to firewall policy groups, according to some embodiments of the present invention.

FIG. 2 is a block diagram that illustrates a network service 10 that is configured to dynamically assign computer network users to firewall policy groups (e.g., to firewall policy groups in the hierarchical structure of FIG. 1), according to some embodiments of the present invention. The illustrated network service 10 is in communication with a network 20, such as the Internet. Although illustrated as connected to the Internet 20, the network service 10 may be connected to or accessible via various other types of networks such as intranets and other private/public communication networks. In FIG. 1, a local network 40 (e.g., an enterprise network) of computers and associated devices that share a common communications line or wireless link is also illustrated. The illustrated local network 40 includes a user device 50 connected thereto. Although illustrated as a personal computer (PC), user device 50 represents any type of device that is configured to run software applications including, but not limited to, servers, personal digital assistants (PDAs), hand-held computers, laptop computers, Internet-ready phones, etc. User device 50 may communicate directly with the local network 40 and other devices connected to the network 40 and/or may communicate wirelessly therewith.

According to some embodiments of the present invention, the user device 50 includes a user-activity agent 52 downloaded from the network service 10 and that monitors user activity including application activity, collects information regarding user activity, and communicates this information to the network service 10, as will be described below. The user-activity agent 52 may be configured, for example, to monitor user keystrokes, user mouse clicks, user access to data and data storage, etc. The user-activity agent 52 is configured to receive queries from the network service 10 and to send user input in response to such queries back to the network service 10.

The illustrated embodiment includes a network firewall 30 and a host firewall 30. As discussed above, the term firewall as used herein includes all types of firewalls at any location. Thus, reference to firewall 30 shall include both the illustrated network firewall 30 and the host firewall 30 on a user device/server, etc.

Each firewall 30 includes a firewall agent 32 downloaded from the network service 10 and that is configured to detect communications associated with users on the network 40. A firewall agent 32 is configured to collect/assemble relevant information regarding user communications and to send this information to the network service 10. Also, a firewall agent 32 is configured to detect blocked communication attempts through a firewall 30 by software applications executing on user devices 50. A firewall agent 32 collects various information about communication attempts blocked by a firewall 30 and communicates this information to the network service 10. A firewall agent 32 may collect various types of information including, but not limited to, N-tuple information (e.g., source and destination addresses of a communication, source and destination ports, communication protocol type and number), software application name, software application version, software application size, software application date, software application format, software application source, and logged communications between a user device 50 and other devices. (e.g., other devices in communication with the communication network 20 and/or with the local network 40), etc.

This information may be collected directly from a user device 50 and/or from other devices on the local network 40 and/or on the Internet 20. In addition, a firewall agent 32 may be configured to monitor communications between a user device 50 and other devices, for example, other devices connected to the local network 40, other devices connected to the Internet 20, other devices in direct communication with user device 50, etc.

According to some embodiments of the present invention, the network service 10 includes an activity analyzer component 12, a policy controller component 14, and a database 16 (or access to a database 16). The database 16 contains analysis rules, analysis-relevant data, firewall policy group selection rules, user profile data for network users of devices 50, and various other parameters and data. The database 16 may also be used to log information about firewall policy groups, etc. For example, the database 16 may be configured to store information about firewall policy group structures (e.g., the hierarchical firewall policy group structure of FIG. 1) and may be configured to display a firewall policy group structure, including information thereabout, to requesting users.

The activity analyzer component 12 is configured to receive information from firewall agents 32 and from user-activity agents 52 as described above (e.g., information about monitored user activity at user devices 50, about detected user communications, information about attempts by software applications on user devices 50 to communicate through firewalls 30, etc.). The activity analyzer component 12 is configured to retrieve relevant rules and data from the database 16, analyze the information received from the firewall agent 32 and user-activity agent 52 to determine what firewall rule detail level is required by and/or appropriate to user activity, and assign users to firewall policy groups. According to some embodiments of the present invention, the activity analyzer component 12 may be configured to request user input and utilize received user input in decisions regarding assignment of users to firewall policy groups (e.g., for purposes of refining rules for assigning users to firewall policy groups, eliminating unresolved ambiguity, etc.).

Firewall rules are intended to include, but not be limited to, "if/then" rules, algorithms, threshold-based methods, pattern matching techniques, look-ups including table look-ups, decision tree approaches and/or other processing/computational methods, etc. During analysis, it may be necessary to obtain additional information from a user device 50 and/or from a user. In this case, the network service 10 may also be configured to request additional information from a firewall agent 32 and/or may also be configured to request additional information from a user-activity agent 52.

According to some embodiments of the present invention, the activity analyzer component 12 is configured to reassign a user to a firewall policy group at a level above a present level if a predefined period of time has elapsed without expected user activity. For example, if a user has been assigned to a firewall policy group that requires a particular level of detail in firewall rules because of the software applications the user utilizes, and the user appears to no longer be using these applications, the activity analyzer component 12 may automatically reassign the user to a different firewall policy group with fewer firewall rule details after a predetermined period of time. This may occur with or without user input.

The activity analyzer component 12 serves as means for assigning a user to a first or initial firewall policy group in a hierarchical structure of firewall policy groups, for example, as illustrated in FIG. 1. The activity analyzer component 12 also serves as means for reassigning users to different firewall policy groups if monitored user activity indicates that a change in detail/detail level of rules is necessary. For example, the activity analyzer component 12 may reassign a user to a different firewall policy group at the same level in a hierarchical structure (e.g., from policy group 2A to policy group 2B), to a different firewall policy group at a higher level in a hierarchical structure (e.g., from policy group 2A to policy group 1), to a different firewall policy group at a lower level in a hierarchical structure (e.g., from policy group 2A to policy group 3C).

According to some embodiments of the present invention, computer network users may be initially assigned to a particular firewall policy group. For example, in the hierarchical structure of FIG. 1, users may be initially assigned to the first tier policy group 1. As user activity dictates, these users are reassigned to more appropriate firewall policy groups. However, embodiments of the present invention are not limited to assigning users to the same initial firewall policy group. Users may be assigned to various different initial firewall policy groups.

The reassignment of users to different firewall policy groups can take place seamlessly and without the knowledge of users, if so desired. Alternatively, the network service 10 may be configured to notify users when reassigned to the different firewall policy groups, and/or the notification may be conditional upon other factors such as user profiles, type of user, applications the user utilizes, time of day, weekday versus weekday, etc. In addition, the network service 10 may be configured to request user input regarding user activity prior to reassigning a user to a different firewall policy group.

The policy controller component 14 is in communication with the activity analyzer component 12 and is configured to communicate firewall policy group assignments and changes thereto to firewall agents 32. In addition, the policy controller component 14 may be configured to revise time windows/timers for users and/or firewall policy groups. For example, each time a user is reassigned to a different firewall policy group, relevant timers regarding user activity may be reset and started. Timers may have different count-down durations depending upon the level of the firewall policy group in a hierarchical structure. For example, more detailed firewall policy groups may have timer values that are smaller (e.g., proportionally smaller) than less detailed firewall policy groups. Moreover, based on global parameters, and for example to increase responsiveness, time windows may be reduced during periods when rates/numbers of firewall policy group changes are high (e.g., via parameters such as "average change rate," "peak changes per day," etc.), and vice versa. Alternately, for other various purposes such as to reduce processing load, time windows may be increased during periods when rates/numbers of firewall policy group changes are high (e.g., via parameters such as "average change rate," "peak changes per day," etc.), and vice versa.

Thus, according to some embodiments of the present invention, when a user is moved to a firewall policy group at a level in a hierarchical structure that is below a current level, a timer may typically be set to monitor duration of user activity in days or shorter periods of time. When a user is moved to a firewall policy group at a level in a hierarchical structure that is above a current level, however, a timer may typically be set to monitor duration of user activity in weeks or longer periods of time.

If no user activity is detected for a particular user and a non-activity timer expires, the user can be requested to provide information about his/her activities in order to determine if the user should still be maintained in the current firewall policy group. Alternatively, the user may be reassigned to another firewall policy group automatically and without requesting information from the user.

The firewall agent 32 implements the decision of the activity analyzer component 12 with respect to firewall policy group assignments at a respective firewall 30 (i.e., the firewall agent 32 receives policy group selection commands and/or firewall policy rule updates from the policy controller component 14 and modifies firewall policy rules at a respective firewall 30). A firewall agent 32 may also be configured to log information about firewall policy groups, etc., in the storage resource of a respective firewall 32.

Embodiments of the present invention are not limited to the above-delineated configurations of the network service 10, firewall agent 32, and user-activity agent 52. One or more of the above-described tasks may be performed by one or more of the network service 10, firewall agent 32, and user-activity agent 52. For example, the firewall agent 32, or a firewall (or a user device) itself, may be configured to detect user activity and determine whether a user should be assigned to a different firewall policy group based upon the detected user activity.

Figure 3:
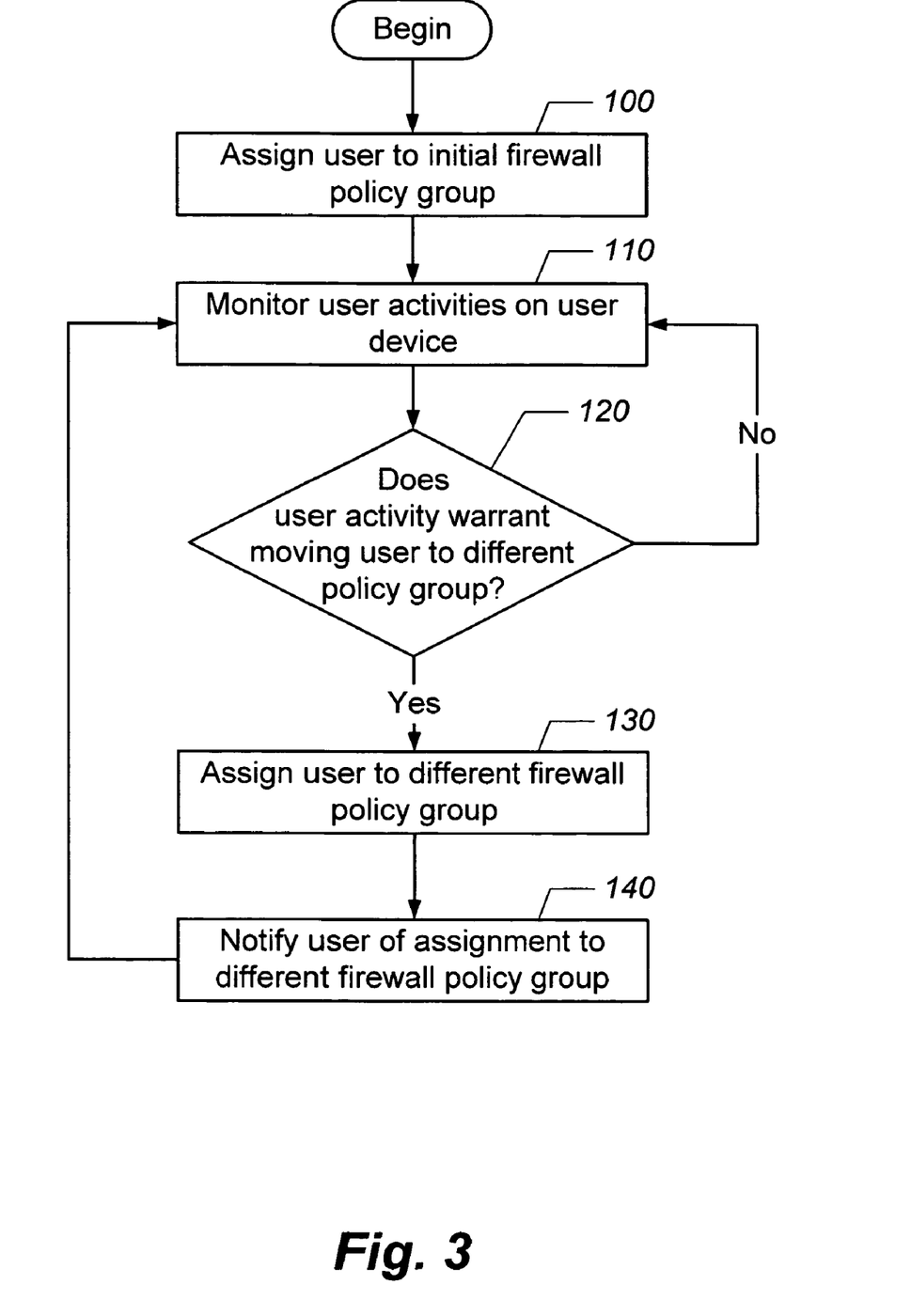
FIGS. 3-4 are flow charts that illustrate exemplary operations for dynamically assigning computer network users to firewall policy groups, according to some embodiments of the present invention.

Exemplary operations for dynamically assigning computer network users to firewall policy groups, according to some embodiments of the present invention, will now be described with reference to FIG. 3. Initially, a user is assigned to a firewall policy group (Block 100) in a hierarchical structure of firewall policy groups (e.g., the hierarchical structure of FIG. 1). User activity on the computer network is monitored (Block 110) and the user is assigned to a different firewall policy group automatically if monitored user activity indicates that a change in detail level of rules is necessary (Block 120). For example, a user may be assigned to a firewall policy group at a level above the level of an existing firewall policy group if a predefined period of time has elapsed without expected user activity on the computer network. Moreover, a user's requirements may have changed that dictate a different firewall policy group. As described above, a user may be assigned to a different firewall policy group that is below, above, or at the same level as the initial firewall policy group. Once reassigned, a user may be notified of the reassignment (Block 140). Alternatively, user input may be requested and utilized in the decision making process regarding whether to reassign the user to another firewall policy group.

Figure 4:
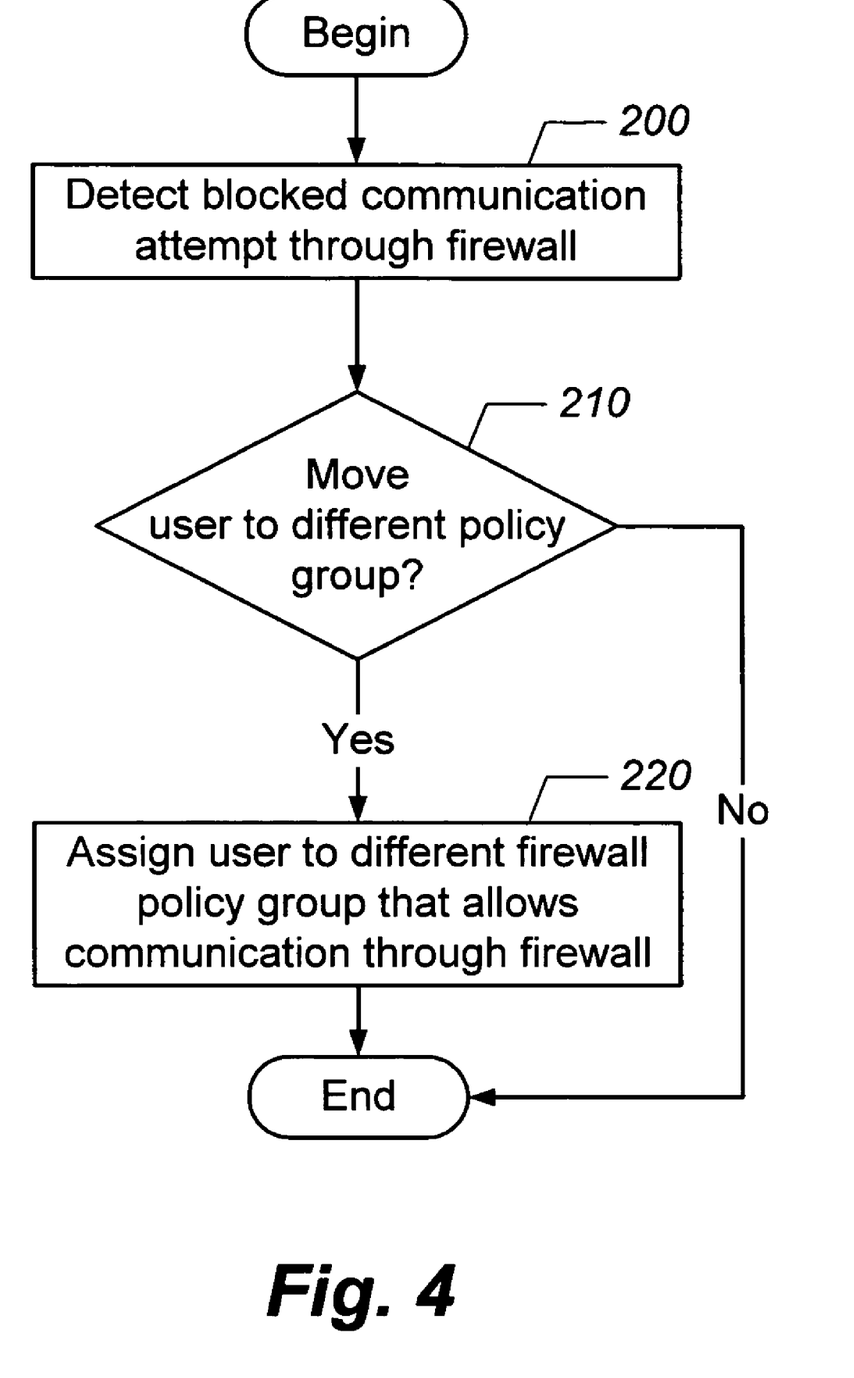

Referring to FIG. 4, if a firewall agent detects a blocked communication attempt by a respective firewall (Block 200), the network service (10, FIG. 1) determines whether to move the user involved in the communication attempt to a different firewall policy group so that the communication is allowed through the firewall (Block 210). If the network service determines that it is okay to allow the communication through the firewall, the user is assigned to a different firewall policy group that allows the communication through the firewall (Block 220).

FIGS. 1-4 illustrate the architecture, functionality, and operations of some embodiments of methods, network services, and computer program products for dynamically assigning computer network users to firewall policy groups. In this regard, each block represents a module, segment, or portion of code, which comprises one or more executable instructions for implementing the specified logical function(s). It should also be noted that in other implementations, the function(s) noted in the blocks may occur out of the order noted in FIGS. 3-4. For example, two blocks shown in succession may, in fact, be executed substantially concurrently or the blocks may sometimes be executed in the reverse order, depending on the functionality involved.

EXAMPLE

Six months previously, Anna subscribed to a security profiling service (i.e., network service 10, FIG. 1) offered by her Internet provider, and installed the software (i.e., user-activity agent 52, FIG. 1) from the service's web site on her PC (e.g., device 50, FIG. 1) and onto a firewall 30 (i.e., firewall agent 32, FIG. 1) of the local network 40 to which Amy's PC is connected. Subsequently, the network service (10, FIG. 1) has received continuous information from the user activity agent 52 about Anna's PC activity, thereby allowing the network service 10 to accurately categorize her user activities. Based on Anna's various detected PC activities and related events (as reflected in her PC), Anna has been sequentially assigned into various firewall policy groups, wherein the policy (i.e., firewall rules) for each defined policy group is appropriately configured/re-configured on an on-going basis by security experts.

Anna frequently uses graphic design software since she is a freelance graphic artist, and has gained experience such that her work has recently evolved and taken on new aspects as she has worked for various larger and larger clients, and in fact she has obtained and used additional professional software tools, each successive product having greater complexity and features. The network service 10 has detected these activities and has successively assigned Anna into more and more detailed firewall policy groups corresponding to more and more capable design practitioners, with policy to allow successively more complex communications.

Anna installs the newest, most capable PC graphic design application suite available, and is attempting to update it by connecting to the graphic design software's web site (the CD containing the graphic design suite was produced several months ago, and the manufacturer provides critical weekly updates on its web site so that professional users will always have the latest features and clip art, etc.). Anna notices that her firewall (i.e., a network-based firewall 30, FIG. 1) provided as part of and managed by her Internet service, does not block the graphic design application's communications (since she has set her provider's firewall option so as to notify her of any "outgoing" connection attempts initiated from her PC that it blocks). Further, Anna notices that her graphic design application does in fact seem to be updating itself without difficulty, and she marvels that she is no longer having any firewall problems now that she has subscribed to the security profiling service 10.

Later that evening, for relaxation, Anna downloads and installs an on-line multi-player fashion simulation game, and starts to play the game. The network service 10, using a "sniffer" software agent (i.e., firewall agent 32) has been monitoring Anna's communications, and has detected that she has been spending increasing amounts of time each day at a related collaborative-gaming web site. The network service 10, realizing that it is increasingly likely Anna would download some of the gaming web site software offerings, has already moved her to a different firewall policy group with a more detailed profile containing firewall rules that explicitly allow the communications of the fashion simulation game (and several of the other most-popular downloads of that site).

Many variations and modifications can be made to the preferred embodiments without substantially departing from the principles of the present invention. All such variations and modifications are intended to be included herein within the scope of the present invention, as set forth in the following claims.

That which is claimed:

1. A method of dynamically assigning a computer network user to one of a plurality of firewall policy groups, wherein each firewall policy group has rules that control whether to block communications through firewalls on the computer network, the method comprising:

assigning a user to a first firewall policy group in a hierarchical structure of firewall policy groups, wherein the user accesses the network via a user device, wherein the hierarchical structure has a plurality of levels, and wherein the plurality of levels are arranged such that rules within the plurality of firewall policy groups are different at each level, wherein the first firewall policy group is based on software applications the user may utilize via the user device;

continuously monitoring user activity on the computer network via an agent at the user device, wherein continuously monitoring comprises monitoring at least one of the following: user keystrokes, user mouse clicks, user access to data and data storage, source and destination addresses of communications, source and destination ports for communications, communication protocol types and numbers, information about software applications utilized, and logged communications between a user device and other devices;

assigning the user to a second, different firewall policy group in the hierarchical structure automatically if monitored user activity indicates that a change in detail level of the rules is necessary;

automatically assigning the user to a third firewall policy group at a level different from the level of the first firewall policy group if a predefined period of time elapses without expected user activity on the computer network, wherein the third firewall policy group has fewer firewall rule details than the first firewall policy group;

detecting an attempt by a software application executing on the user device to communicate through a firewall, wherein the firewall has blocked the communication attempt; and assigning the user to a different one of the plurality of firewall policy groups that allows the communication through the firewall.

2. The method of claim 1, wherein continuously monitoring also comprises obtaining a user response to at least one query.

3. The method of claim 1, wherein the predefined period of time is variable based on the number of firewall policy group changes of other users on the computer network occurring at a particular time.

4. The method of claim 1, further comprising notifying the user when the user is assigned to the second firewall policy group.

5. The method of claim 1, further comprising requesting user input regarding user activity prior to assigning the user to the third firewall policy group.

6. The method of claim 1, further comprising notifying the user when the user is assigned to a different firewall policy group.

7. The method of claim 1, wherein continuously monitoring user activity on the computer network comprises determining what detail level is required by user activity.

8. The method of claim 1, further comprising displaying the hierarchical tree structure to the user in response to a user request therefor.

9. A network service that dynamically assigns a computer network user to one of a plurality of firewall policy groups, wherein each firewall policy group has rules that control whether to block communications through firewalls on the computer network, comprising:

means for assigning a user to a first firewall policy group in a hierarchical structure of firewall policy groups, wherein the user accesses the network via a user device, wherein the hierarchical structure has a plurality of levels, and wherein the plurality of levels are arranged such that rules within the plurality of firewall policy groups are different at each level, wherein the first firewall policy group is based on software applications the user may utilize via the user device;

means for continuously monitoring user activity on the computer network via an agent at the user device comprising means for monitoring at least one of the following: user keystrokes, user mouse clicks, user access to data and data storage, source and destination addresses of communications, source and destination ports for communications, communication protocol types and numbers, information about software applications utilized, and logged communications between a user device and other devices;

means for assigning the user to a second, different firewall policy group in the hierarchical structure automatically if monitored user activity indicates that a change in detail level of the rules is necessary, wherein the second firewall policy group is at a level below or above the first firewall policy group level;

means for automatically assigning the user to a third firewall policy group at a level different from the level of the first firewall policy group if a predefined period of time elapses without expected user activity on the computer network, wherein the third firewall policy group has fewer firewall rule details than the first firewall policy group;

means for detecting an attempt by a software application executing on the user device to communicate through a firewall, wherein the firewall has blocked the communication attempt; and means for assigning the user to a different one of the plurality of firewall policy groups that allows the communication through the firewall.

10. The network service of claim 9, further comprising means for notifying the user when the user is assigned to the second firewall policy group.

11. The network service of claim 9, further comprising means for requesting user input regarding user activity prior to assigning the user to the third firewall policy group.

12. The network service of claim 9, wherein the means for continuously monitoring user activity on the computer network comprises means for determining what detail level is required by user activity.

13. The network service of claim 9, further comprising means for displaying the hierarchical tree structure to the user in response to a user request therefor.

14. A computer program product that dynamically assigns a computer network user to one of a plurality of firewall policy groups, wherein each firewall policy group has rules that control whether to block communications through firewalls on the computer network, comprising a non-transitory computer readable storage medium having encoded thereon instructions that, when executed on a processor, causes the processor to perform the following:

assign a user to a first firewall policy group in a hierarchical structure of firewall policy groups, wherein the user accesses the network via a user device, wherein the hierarchical structure has a plurality of levels, and wherein the plurality of levels are arranged such that rules within the plurality of firewall policy groups are different at each level, wherein the first firewall policy group is based on software applications the user may utilize via the user device;

continuously monitor user activity on the computer network via an agent at the user device, comprising monitoring at least one of the following: user keystrokes, user mouse clicks, user access to data and data storage, source and destination addresses of communications, source and destination ports for communications, communication protocol types and numbers, information about software applications utilized, and logged communications between a user device and other devices;

assign the user to a second, different firewall policy group in the hierarchical structure automatically if monitored user activity indicates that a change in detail level of the rules is necessary;

automatically assign the user to a third firewall policy group at a level different from the level of the first firewall policy group if a predefined period of time elapses without expected user activity on the computer network, wherein the third firewall policy group has fewer firewall rule details than the first firewall policy group;

detect an attempt by a software application executing on the user device to communicate through a firewall, wherein the firewall has blocked the communication attempt; and assign the user to a different one of the plurality of firewall policy groups that allows the communication through the firewall.

* * * * *